United States Patent
Inage et al.

(10) Patent No.: US 6,910,745 B2
(45) Date of Patent: Jun. 28, 2005

(54) CHECK VALVE WITH VIBRATION PREVENTION FUNCTION

(75) Inventors: Shozo Inage, Anjo (JP); Kaneyoshi Nagatani, Kariya (JP); Koji Yanai, Kariya (JP); Nobuhiko Yoshioka, Anjo (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/458,276

(22) Filed: Jun. 11, 2003

(65) Prior Publication Data

US 2003/0230930 A1 Dec. 18, 2003

(30) Foreign Application Priority Data

Jun. 17, 2002 (JP) ........................................ 2002-176020

(51) Int. Cl.$^7$ ................................................ B60T 8/42
(52) U.S. Cl. ................................ 303/115.4; 303/115.1; 137/539.5
(58) Field of Search .......................... 303/115.4, 115.1, 303/901; 251/315.01, 315.07, 339; 137/901, 614.14, 539.5, 535; 138/31

(56) References Cited

U.S. PATENT DOCUMENTS

| | | | | |
|---|---|---|---|---|
| 3,465,787 A | * | 9/1969 | Gulick | 137/539.5 |
| 4,290,152 A | * | 9/1981 | Kesselman, Sr. | 4/678 |
| 4,431,026 A | * | 2/1984 | Fehrenbach et al. | 137/510 |
| 4,655,396 A | * | 4/1987 | Taxon et al. | 239/585.3 |
| 4,703,979 A | * | 11/1987 | Nakanishi et al. | 303/116.1 |
| 4,825,903 A | * | 5/1989 | Ochs et al. | 137/529 |
| 4,997,004 A | * | 3/1991 | Barkhimer | 137/596.17 |
| 5,271,667 A | * | 12/1993 | Takata et al. | 303/113.2 |
| 5,381,966 A | * | 1/1995 | Gernert, II | 239/585.3 |
| 5,556,175 A | * | 9/1996 | Hayakawa et al. | 303/119.2 |
| 6,302,498 B1 | * | 10/2001 | Ariki et al. | 303/115.4 |
| 6,662,824 B2 | | 12/2003 | Inage et al. | |

FOREIGN PATENT DOCUMENTS

JP  A-2001-099339  4/2001

\* cited by examiner

Primary Examiner—Robert A. Siconolfi
Assistant Examiner—Melanie Torres
(74) Attorney, Agent, or Firm—Posz Law Group, PLC (57) ABSTRACT

In a check valve of the present invention, when a pressure action direction of a fluid on a valve body is assumed to be X, a spring receiving surface that abuts with a seat surface that is at one end in an axial direction of the helical compression spring is made to incline with respect to a surface perpendicular to the pressure action direction X. Accordingly, an urging force of the helical compression spring on the valve body acts obliquely with respect to the pressure action direction X. Thus the valve body is pressed to a side wall surface when the valve is opened, and vibration of the valve body is inhibited. Accordingly, it is possible to embody the invention with an extremely simple structure in which the spring receiving surface is inclined with respect to the surface perpendicular to the pressure action direction X.

4 Claims, 5 Drawing Sheets

CHECK VALVE WITH VIBRATION PREVENTION FUNCTION

CROSS REFERENCE TO RELATED APPLICATION

This application is based upon and claims the benefit of Japanese Patent Application No. 2002-176020 filed on Jun. 17, 2002, the content of which are incorporated herein by reference.

1. Field of the Invention

The present invention relates to a check valve that permits flow of fluid in only one direction. More particularly, it relates to a check valve that may be preferably disposed at a discharge side of a hydraulic pressure pump.

2. Related Art of the Invention

A conventional check valve for opening and closing a fluid path uses a ball that seats on and separates from a valve seat surface. In this type of the check valve, the ball, that acts as a valve body, is urged toward the valve seat surface (namely, in a valve closing direction) by a helical spring.

When a pressure upstream of the valve seat surface becomes higher than a pressure downstream thereof by a predetermined pressure or more, the ball separates from the valve seat surface while resisting an urging force of the helical spring. Therefore, the check valve is opened such that fluid flows in a certain direction. Additionally, while the valve is being opened, the ball receives both a force generated by fluid flow and the urging force of the helical spring. The ball moves to a position at which both forces are balanced.

When the aforementioned conventional check valve is disposed, for example, at a discharge side of a pump, pulsation of a discharge pressure of the pump changes the force generated by fluid flow. Accordingly, the position of the ball is changed, and thus the ball vibrates. This causes a problem in which the vibration of the ball amplifies pressure pulsation.

SUMMARY OF THE INVENTION

In view of the foregoing situation, an object of the present invention is to prevent or inhibit vibration of a valve body from amplifying pressure pulsation in a check valve for opening and closing a fluid path using a valve body that seats on and separates from a valve seat surface.

A check valve according to a first aspect of the present invention includes a case member which forms a fluid path inside the case member; a valve seat surface which is formed in the case member and disposed in the middle of the fluid path; a valve body which is disposed downstream of the valve seat surface in the fluid path and opens and closes the fluid path by seating on and separating from the valve seat surface; and a helical compression spring which is disposed in the case member and urges the valve body in a valve closing direction.

Moreover, in the check valve according to the first aspect of the invention, a side wall surface and a spring receiving surface are formed in the case member. When a direction of action of a pressure of a fluid upstream of the valve seat surface is defined as a pressure action direction X, the side wall surface restricts a movement area of the valve body in a direction perpendicular to the pressure action direction X. Moreover, in this case, the spring receiving surface abuts with a seat surface that is at one end in an axial direction of the helical compression spring. Further, the spring receiving surface inclines with respect to a surface perpendicular to the pressure action direction X.

Accordingly, an urging force of the helical compression spring on the valve body acts at an oblique angle with respect to the pressure action direction X. Thus, when the valve is opened, the valve body is pressed to the side wall surface and vibration of the valve body is inhibited. Accordingly, vibration of the valve body is prevented or inhibited, and as well as this, pressure pulsation from amplification is also prevented or inhibited.

Moreover, the check valve according to this aspect may be embodied by an extremely simple structure in which the spring receiving surface inclines toward the surface perpendicular to the pressure action direction X.

In a check valve according to a second aspect of the present invention, a side wall surface is formed in a case member, the side wall surface restricting the movement area of a valve body in a direction perpendicular to a pressure action direction X, the pressure action direction X defined as a direction in which a pressure of a fluid upstream of a valve seat surface acts. Further, a helical compression spring has two seat surfaces at both ends in an axial direction, these two surfaces are parallel with each other, and are not perpendicular to a central axis of the helical compression spring, when it is in a non-compressed state.

Accordingly, an urging force of the helical compression spring on the valve body acts at an oblique angle with respect to the pressure action direction X. Thus, when the valve is opened, the valve body is pressed to the side wall surface and vibration of the valve body is inhibited. Accordingly, vibration of the valve body is prevented or inhibited, and as well as this, pressure pulsation from amplification is also prevented or inhibited.

Moreover, the check valve according to this aspect may be embodied by an extremely simple structure in which the seat surface of the helical compression spring is not perpendicular to the central axis.

A check valve according to a third aspect of the present invention, a side wall surface is formed in the case member, the side wall surface restricting a movement area of the valve body in a direction perpendicular to a pressure action direction X, the pressure action direction X defined as a direction in which a pressure of a fluid upstream of the valve seat surface acts. Further, a helical compression spring has two seat surfaces at restrictive ends in an axial direction, these two surfaces are not parallel with each other, and are not perpendicular to a central axis of the helical compression spring, when it is in a non-compressed state.

Accordingly, an urging force of the helical compression spring on the valve body acts at an oblique angle with respect to the pressure action direction X. Thus, when the valve is opened, the valve body is pressed to the side wall surface and vibration of the valve body is inhibited. Accordingly, vibration of the valve body is prevented or inhibited, and as well as this, pressure pulsation from amplification is also prevented or inhibited.

Moreover, the check valve according to this aspect may be embodied by an extremely simple structure in which the seat surface of the helical compression spring is not perpendicular to the central axis.

A check valve according to a fourth aspect of the present invention includes a transmission member that is disposed between the valve body and the helical compression spring for transmitting the urging force of the helical compression spring to the valve body. An abutting surface of the transmission member that abuts with the valve body is a flat surface.

Accordingly, since the abutting surface of the transmission member with the valve body is a flat surface, a direction in which the urging force acts on the valve is kept constant. Therefore, it is possible to ensure a vibration inhibition effect of the valve body more reliably.

According to a fifth aspect of the present invention, in the check valve according to the third aspect, a spring receiving surface is formed in the case member. The spring receiving surface abuts with a seat surface that is at one end in an axial direction of the helical compression spring. The spring receiving surface inclines with respect to the surface perpendicular to a pressure action direction X.

Accordingly, a component force which acts in a direction in which the valve body is pressed to the side wall surface when the valve is opened is increased. Therefore, vibration of the valve body is more reliably inhibited.

According to a sixth aspect of the present invention, the check valve according to any one of the first to fifth aspects of the present invention may be applied as a check valve disposed at a discharge side of a brake actuator. The brake actuator is structured in which a brake fluid pressure is transmitted from a master cylinder to a wheel cylinder, so as to generate braking force on the wheels, and includes a pump that sucks up brake fluid at a side of the wheel cylinder and discharges the sucked up brake fluid to a side of the master cylinder. Specifically, the check valve as described above is disposed at the discharge side of the pump.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

(First Embodiment)

Figure 1:
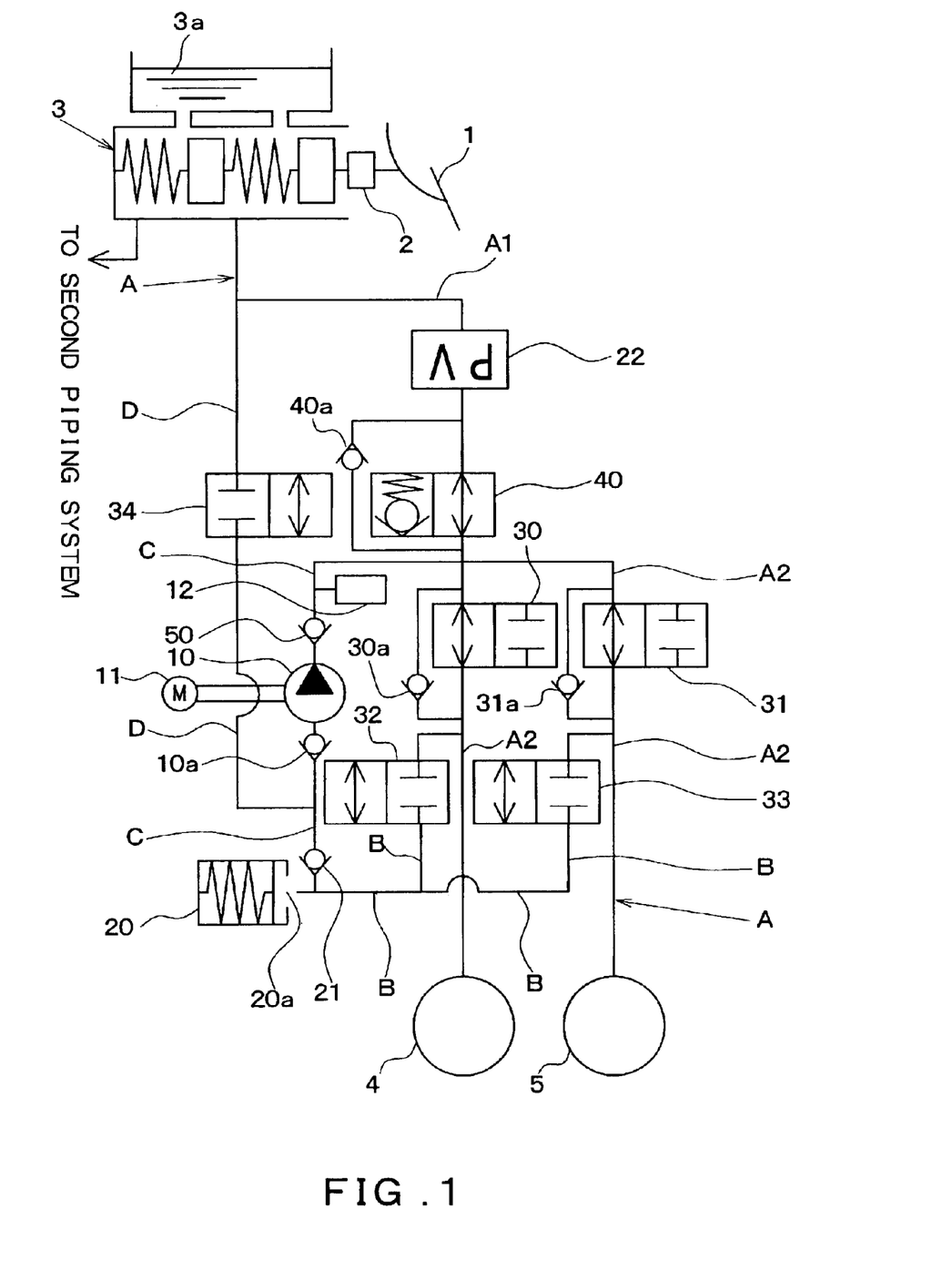
FIG. 1 is a schematic view of a piping system of a braking apparatus provided with a rotary pump according to a first embodiment of the present invention.

Hereinafter, a first embodiment will be explained with reference to the drawings. FIG. 1 is a schematic view of a brake piping system of a braking apparatus. A fundamental configuration of the braking apparatus will be explained with reference to FIG. 1. In the first embodiment, an example will be explained in which the braking apparatus according to the present invention is applied to a four-wheeled front-wheel-drive vehicle configured with a hydraulic circuit piping X that is provided with two piping systems, these being a front-right/rear-left wheel piping system and a front-left/rear-right wheel piping system, respectively.

As shown in FIG. 1, a brake pedal 1 is connected to a booster 2, and a brake depression force is increased by the booster 2. The booster 2 has a push rod that transmits the increased brake depression force to a master cylinder 3. A master cylinder pressure is generated by the push rod pushing a master piston disposed in the master cylinder 3. The brake pedal 1, the booster 2 and the master cylinder 3 correspond to a brake fluid pressure generation portion.

The master cylinder 3 is connected to a master reservoir 3a that supplies brake fluid to the master cylinder 3 and stores excess brake fluid from the master cylinder 3.

The master cylinder pressure is transmitted to a wheel cylinder 4 for a front-right wheel FR and a wheel cylinder 5 for a rear-left wheel RL via an anti-lock braking system (hereinafter referred to as "ABS"). It should be noted that, although the following explanation will describe the front-right wheel FR and the rear-left wheel RL, the front-left wheel FL and the rear-right wheel RR that form the second piping system function in the same way, and thus a description will be omitted here.

The braking apparatus is provided with a conduit (main conduit) A connected to the master cylinder 3, and a proportioning valve 22 disposed in the conduit A. The proportioning valve 22 divides the conduit A into two sections. In other words, the conduit A is divided into: a conduit A1 that extends from the master cylinder 3 to the proportioning valve 22 and which receives the master cylinder pressure; and a conduit A2 that extends from the proportioning valve 22 to each of the wheel cylinders 4 and 5.

When brake fluid flows in a normal direction, generally, the proportioning valve 22 acts such that a standard pressure of the brake fluid is changed at a certain damping ratio and transmitted to a downstream side of the proportioning valve 22. As shown in FIG. 1, since the proportioning valve 22 is connected in reverse, the pressure of the conduit A2 is defined as the standard pressure.

Within the conduit A2, the conduit A divides into two branches. A first pressure increase control valve 30 for controlling brake fluid pressure increase to the wheel cylinder 4 is provided in one branch. In the other branch, a second pressure increase control valve 31 for controlling brake fluid pressure increase to the wheel cylinder 5 is provided.

These pressure increase control valves 30 and 31 are configured as two position valves having an opened state and a closed state which can be controlled by an electronic control unit (hereinafter referred to as "ECU") for the ABS control. When these two position valves are controlled so as to be in the opened state, the master cylinder pressure or a brake fluid pressure resulting from brake fluid discharged from pump is applied to each of the wheel cylinders 4 and 5. The pressure increase control valves 30 and 31 are controlled so as to normally be in the opened state at times of normal braking when an ABS control is not being executed.

Respective safety valves 30a and 31a are provided in parallel with the pressure increase control valves 30 and 31, such that brake fluid from the wheel cylinders 4 and 5 is discharged when brake depression is stopped and the ABS control is terminated.

Respective pressure decrease control valves 32 and 33 having an opened state and a closed state that can be controlled by the ECU for the ABS control are disposed in respective conduits B that connect a reservoir hole 20a of a reservoir 20 with the respective branches of the conduits A2 at respective points between the first and second pressure increase control valves 30 and 31 and each of the wheel cylinders 4 and 5. These pressure decrease control valves 32 and 33 are normally closed during normal braking (when the ABS control is not being executed).

A rotary pump 10 is disposed in a conduit C connecting a point of conduit A between the proportioning valve 22 and the pressure increase control valves 30 and 31 with the reservoir hole 20a of the reservoir 20. The rotary pump 10 is disposed so as to be sandwiched between sucking up side and discharge side check valves 10a and 50. When the ABS control is executed, brake fluid in the wheel cylinders 4, 5 moves the reservoir 20 during wheel cylinder pressure decrease period. Therefore, the rotary pump 10 sucks up the brake fluid in the reservoir 20 and discharges it to the conduit A2. The check valve 50 located at a discharge side of the rotary pump 10 corresponds to a check valve of the present invention.

A motor 11 is connected to the rotary pump 10 such that the rotary pump 10 is driven by the motor 11. The rotary pump is a trochoid pump or the like in which rotors thereof are abutted with each other.

In order to reduce pulsation of brake fluid discharged from the rotary pump 10, a damper 12 is disposed in the conduit C at a discharge side of the rotary pump 10. Further, a conduit (auxiliary conduit) D that connects with the master cylinder 3 is provided between the reservoir 20 and the rotary pump 10. The rotary pump 10 intakes brake fluid from the conduit A1 via the conduit D, and discharges the brake fluid to the conduit A2. Accordingly, a wheel braking force is increased by a wheel cylinder pressure of the wheel cylinders 4 and 5 being made higher than the master cylinder pressure. At this time, the proportioning valve 22 maintains a pressure difference of the master cylinder pressure and the wheel cylinder pressure.

A control valve 34 is provided in the conduit D. This control valve 34 is normally placed in an opened state during normal braking. Further, an check valve 21 is disposed between a section connecting the conduit C with the conduit D and the reservoir 20, so that reverse flow toward the reservoir 20 from the conduit C does not occur due to fluid pressure transmitted from the conduit D.

A control valve 40 is provided in the section of conduit A between the proportioning valve 22 and the pressure increase control valves 30 and 31. The control valve 40 is a two position valve that is normally placed in an opened state. When the master cylinder pressure is lower than a predetermined pressure, and pressures of the wheel cylinders 4 and 5 is rapidly increased in order to brake suddenly, or when a traction control system (TCS) is executed, the control valve 40 is closed, such that a difference between a brake fluid pressure on a side of the master cylinder 3 and that on a side of the wheel cylinder 4 and 5 is maintained.

Further, the control valve 40 is arranged in parallel with the safety valve 40a, such that brake fluid pressure is applied from the side of the master cylinder 3 to the side of the wheel cylinder 4 and 5 when the control valve 40 is in the closed state.

Figure 2:
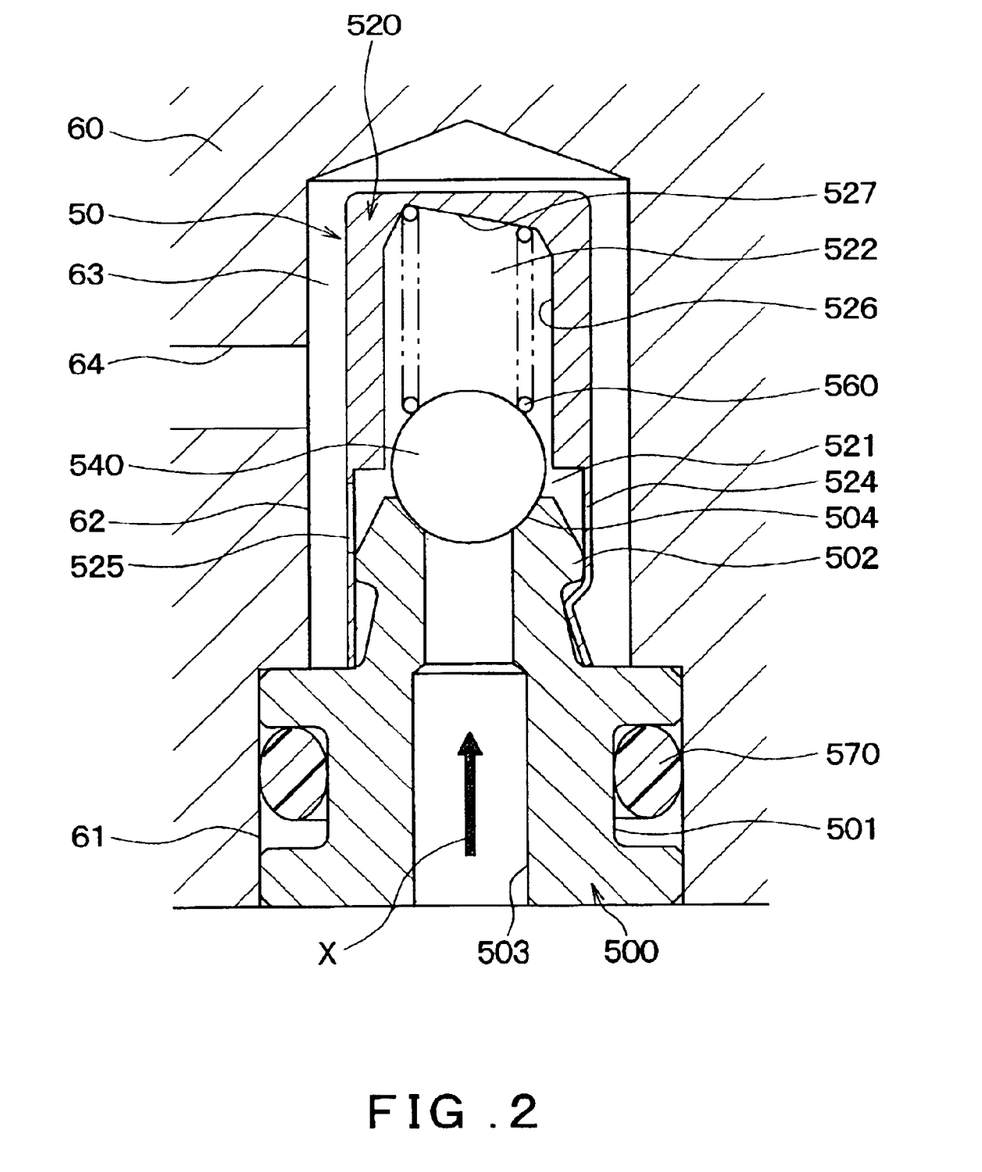
FIG. 2 is a cross sectional view of a check valve according to the first embodiment when the check valve is closed.
Figure 3:
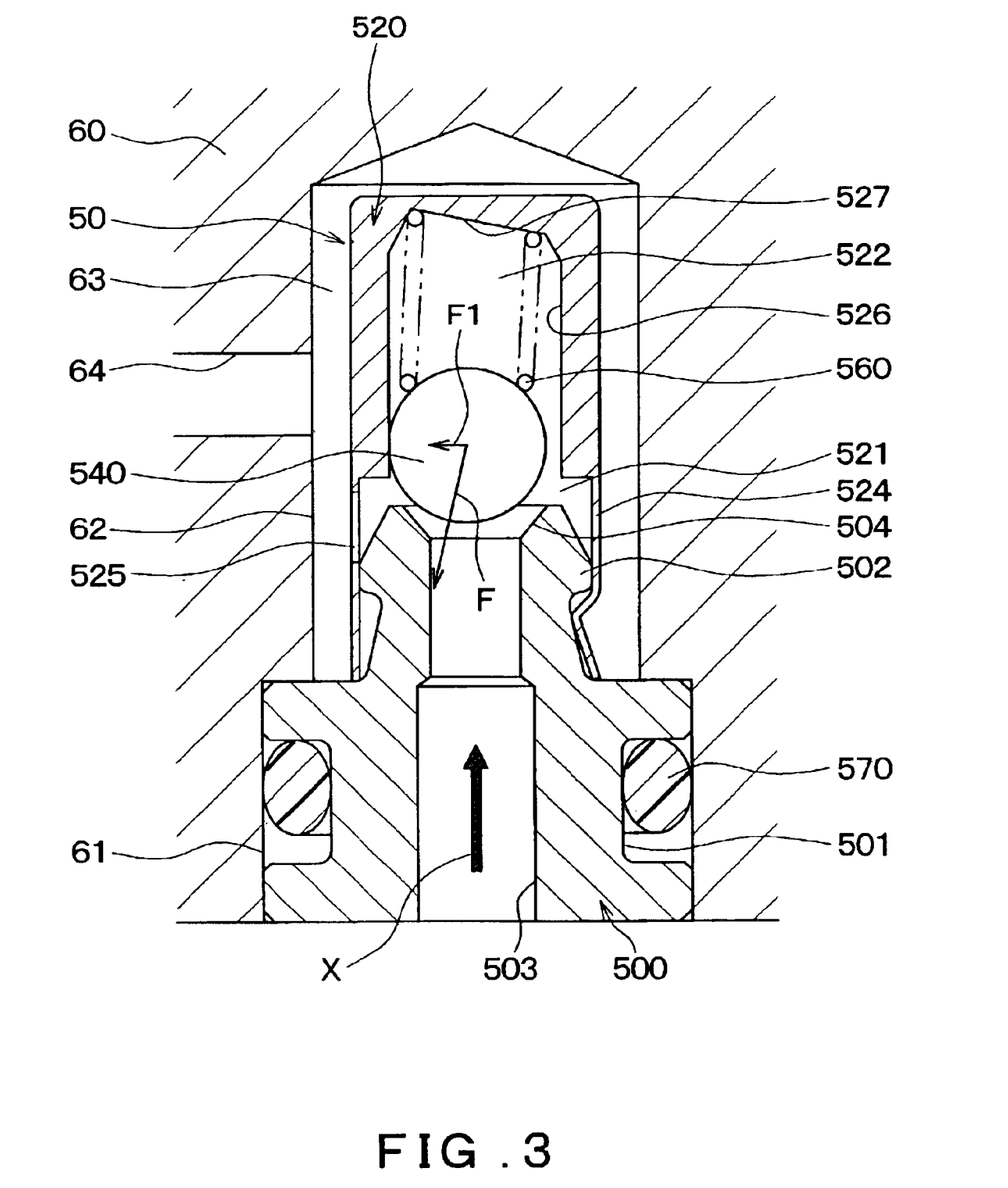
FIG. 3 is a cross sectional view of the check valve of FIG. 2 when the check valve is opened.

Hereafter, details of a check valve 50 will be explained while referring to FIGS. 2 and 3. FIG. 2 is a cross sectional view of the check valve 50 when it is closed, and FIG. 3 is a cross sectional view of the check valve 50 when it is opened. Moreover, FIG. 4 is a cross section showing a shape of a helical compression spring 560, which is used in the check valve 50, when it is in a non-compressed state.

The check valve 50 in FIG. 2 includes a seat 500, a sleeve 520, a ball 540, a helical compression spring 560, and an O-ring 570. The O-ring 570 is made of rubber, and the rest of the structural members are made of metal.

Figure 4:
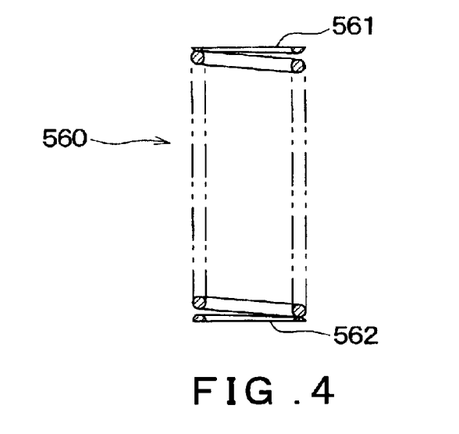
FIG. 4 is a cross sectional view showing a shape of a helical compression spring of FIG. 2 when it is in a non-compressed state.

As shown in FIG. 4, the helical compression spring 560 is a cylindrical helical compression spring. Two seat surfaces 561 and 562 of the helical compression spring 560 that are disposed at restrictive ends in an axial direction are parallel with each other when the helical compression spring 560 is in a non-compressed state. Further, the two seat surfaces 561 and 562 are perpendicular to a central axis of the helical compression spring 560.

As shown in FIG. 2, the check valve 50, the various valves for the ABS control device described above, the rotary pump 10, and the like, are assembled to a casing 60 of the ABS control device. Specifically, the check valve 50 is fixed to the casing 60 by being inserted into stepped holes 61 and 62 of the casing 60. During this insertion, the seat 500 of the check valve 50 is pressed into the larger diameter stepped hole 61 which has a larger diameter than the stepped hole 62.

Meanwhile, a chamber 63 is created between the smaller diameter stepped hole 62 of the casing 60 and an outer peripheral surface of the sleeve 520 of the check valve 50. The chamber 63 acts as a path for the brake fluid and communicates with a passage hole 64 formed in the casing 60. Note that the passage hole 64 constitutes a part of a conduit C provided in the ABS control device. The brake fluid discharged from the rotary pump 10 passes through the check valve 50, flows into the chamber 63, and then into the passage hole 64.

A profile of the seat 500 constituting the case member is a substantially cylindrical stepped shape. A groove 501 is formed on an outer peripheral surface of a large diameter portion of the seat 500 into which the O-ring 570 is inserted, while a protruding portion 502 is formed on an outer peripheral surface of a small diameter portion of the seat 500 so as to protrude outwardly in the radial direction.

A circular passage hole 503 is formed at a central portion in the radial direction of the seat 500 so as to pass through the seat 500 in the axial direction. The passage hole 503 acts as a path for the brake fluid. A conical valve seat surface 504 is formed at an opening portion downstream of the passage hole 503.

The ball 540 that acts as a valve body is disposed downstream of the valve seat surface 504, so as to face the valve seat surface 504. The pressure of the brake fluid upstream (hereinafter referred to as an "upstream brake fluid pressure") of the valve seat surface 504 acts on the ball 540 so as to open the ball. Meanwhile, a direction in which the upstream brake fluid pressure of the valve seat surface 504 acts on the ball 540 will be hereafter referred to as a "pressure action direction X." The pressure action direction X is parallel with the passage hole 503 and the axis line of the valve seat surface 504.

Stepped hollow portions are formed in the bottomed cylindrical sleeve 520 that constitutes the case member. Specifically, first and second cylindrical hollow portions 521 and 522 are formed. Among these two hollow portions 521 and 522, the first hollow portion 521 disposed at an opening end portion side of the sleeve 520 acts as a path for the brake fluid. The first hollow portion 521 is surrounded by a thin cylindrical portion 524. The cylindrical portion 524 is formed with an opening portion 525 that communicates the interior and exterior of the cylindrical portion 524 and acts as a path for the brake fluid. Further, the opening portion 525 is disposed in a direction of a component force F1 which acts in a direction perpendicular to the pressure action direction X and, which is one of the component forces of a spring force F to be described later (see FIG. 3).

The second hollow portion 522 is disposed closer to a bottom portion than the first hollow portion 521, and has a smaller diameter than the first hollow portion 521. The second hollow portion 522 is formed coaxially with an axis line of the passage hole 503 of the seat 500 and the valve seat surface 504. Further, the second hollow portion 522 is surrounded by an inner peripheral side wall surface 526 and a spring receiving surface 527. The inner peripheral side wall surface 526 extends in the pressure action direction X, while the spring receiving surface 527 is disposed closer to the bottom portion, and is inclined at approximately 15 degrees with respect to a surface perpendicular to the pressure action direction X. The inner peripheral side wall surface 526 restricts a movement area of the ball 540 in a direction perpendicular to the pressure action direction X.

Further, the helical compression spring 560 is disposed in the second hollow portion 520. A seat surface 561 of the helical compression spring 560 closer to the bottom portion abuts with the spring receiving surface 527, and the seat surface 562 of the helical compression spring 560 closer to the ball 540 abuts with the ball 540. Accordingly, the ball 540 is urged by the helical compression spring 560 in a valve closing direction.

After housing the ball 540 and the helical compression spring 560 in the sleeve 520, three points closer to the opening end portion of the cylindrical portion 524 are caulked so as to engage the sleeve 520 with the protruding portion 502. Accordingly, the check valve 50 is structured such that the seat 500 is integrated with the sleeve 520.

Next, an operation of the check valve 50 with the above structure will be explained while referring to FIGS. 2 to 4. During the ABS control or the like, the rotary pump 10 is operated to pressurize and discharge the brake fluid that the rotary pump 10 sucked up. The discharged brake fluid flows to the discharge side passage hole 503 of the check valve 50. Moreover, the brake fluid pressure acts on the ball 540 in the pressure action direction X.

When the ball 540 is moved in the valve opening direction resisting the spring force F of the helical compression spring 560, the brake fluid that flows into the passage hole 503, passes through the first hollow portion 521, the opening portion 525, and the chamber 63, and then flows into the passage hole 64.

The spring receiving surface 527 is inclined with respect to the surface perpendicular to the pressure action direction X. Therefore, a direction of the spring force F which acts on the ball 540 is oblique with respect to the pressure action direction X. Accordingly, when the valve is opened as shown in FIG. 3, the ball 540 is pressed to the inner peripheral side wall surface 526 by the component force F1 which acts in a direction perpendicular to the pressure action direction X and, which is one of the component forces of a spring force F (hereafter referred to as "a perpendicular direction component force F1") Accordingly, vibration of the ball 540 is inhibited.

Therefore, even when the force generated by the flow of the brake fluid acting on the ball 540 changes due to pulsation in a pump discharge pressure, vibration of the ball 540 is prevented. Therefore, amplification of the pressure pulsation caused by vibration of the ball 540 is also prevented.

Moreover, the opening portion 525 is disposed in line with the direction of the perpendicular direction component force F1. Therefore, the direction of the flow of the brake fluid that flows through the passage hole 503 and the first hollow portion 521, and then into the opening portion 525 corresponds to the perpendicular direction component force F1. Accordingly, the ball 540 is also pressed by the force generated by the flow of the brake fluid that flows into the opening portion 525, and vibration of the ball 540 is more reliably inhibited.

(Second Embodiment)

Figure 5:
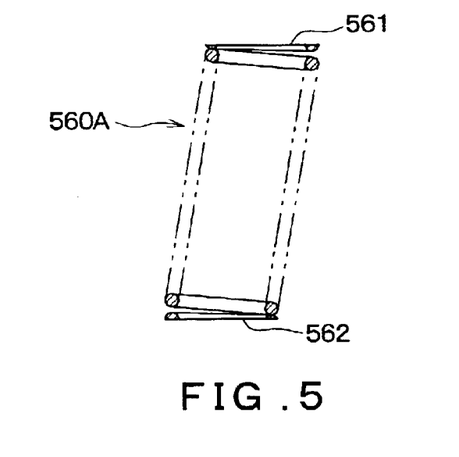
FIG. 5 is a cross section showing a shape of a helical compression spring to be used for a check valve according to a second embodiment of the present invention.

A check valve according to a second embodiment differs from that of the first embodiment with respect to the fact that the structure of the helical compression spring 560 is modified. Other structural elements are the same as those of the first embodiment.

As shown in FIG. 5, a helical compression spring 560A according to the second embodiment is a cylindrical helical compression spring. Two seat surfaces 561 and 562 of the helical compression spring 560A that are disposed at restrictive ends in an axial direction are parallel with each other in a non-compressed state. Further, the two seat surfaces 561 and 562 are not perpendicular to a central axis of the helical compression spring 560A.

By utilizing the characteristic that the two seat surfaces 561 and 562 are not perpendicular to the central axis of the helical compression spring 560A, the helical compression spring 560A is attached such that the obliqueness of the direction of the spring force F with respect to the pressure action direction X becomes larger. Therefore, the perpendicular direction component force F1 when the valve is opened becomes larger than that of the first embodiment. Accordingly, the ball 540 is pressed more forcefully by the inner peripheral side wall surface 526, and thus vibration of the ball 540 is inhibited more reliably.

Note that when the helical compression spring 560A according to the second embodiment is used, the spring receiving surface 527 may be perpendicular to the pressure action direction X. However, even in this case, since the seat surfaces 561 and 562 are not perpendicular to the central axis of the helical compression spring 560A, the direction of the spring force F that acts on the ball 540 is oblique to the pressure action direction X. Thus, the ball 540 is pressed to the inner peripheral side wall surface 526 when the valve is opened, and vibration of the ball 540 is inhibited.

(Third Embodiment)

Figure 6:
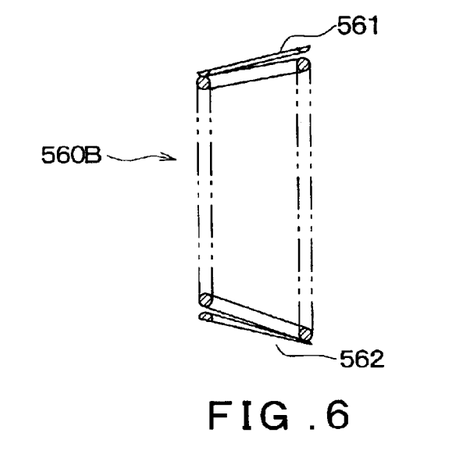
FIG. 6 is a cross section showing a shape of a helical compression spring to be used for a check valve according to a third embodiment of the present invention.

A check valve according to a third embodiment differs from that of the first embodiment with respect to the fact that the structure of the helical compression spring 560. Other structural elements are the same as the first embodiment.

As shown in FIG. 6, a helical compression spring 560B is a cylindrical helical compression spring. Two seat surfaces 561 and 562 of the helical compression spring 560B that are disposed at restrictive ends in an axial direction are not parallel with each other when the helical compression spring 560B is in a non-compressed state. Further, the two seat surfaces 561 and 562 are not perpendicular to a central axis of the helical compression spring 560B.

By utilizing the characteristics that the two seat surfaces 561 and 562 are not parallel with each other and are not perpendicular to the central axis of the helical compression spring 560A, the helical compression spring 560B is attached such that the obliqueness of the direction of the spring force F with respect to the pressure action direction X becomes larger. Therefore, the perpendicular direction component force F1 when the valve is opened becomes larger than that of the first embodiment. Accordingly, the ball 540 is pressed more forcefully by the inner peripheral side wall surface 526, and vibration of the ball 540 is inhibited more reliably.

Note that when the helical compression spring 560B according to the second embodiment is used, the spring receiving surface 527 maybe perpendicular to the pressure action direction X. However, even in this case, since the seat surfaces 561 and 562 are not perpendicular to the central axis of the helical compression spring 560A, the direction of the spring force F that acts on the ball 540 inclines with respect to the pressure action direction X. Thus, the ball 540 is pressed to the inner peripheral side wall surface 526 when the valve is opened, and vibration of the ball 540 is inhibited.

Further, when the helical compression spring 560B as described above is used, if rotation of the helical compression spring 560B is prevented, a direction of action of the helical compression spring 560B is urged becomes more constant.

(Fourth Embodiment)

Figure 7:
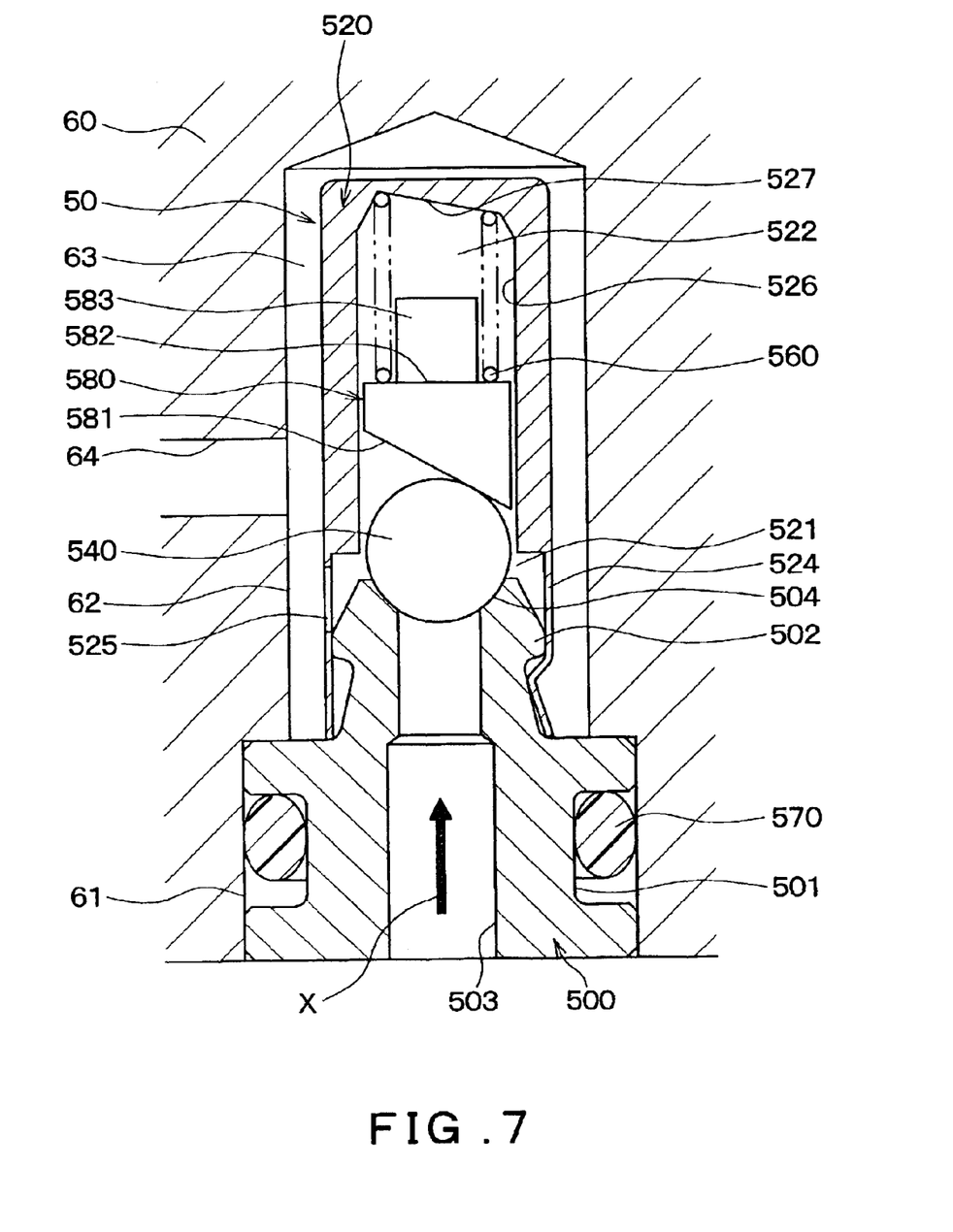
FIG. 7 is a cross section showing main portion of a check valve according to a fourth embodiment of the present invention.

A check valve according to a fourth embodiment is the same as the check valve 50 according to the first embodiment, except that a rod 580 is added. Other structural elements are the same as those of the first embodiment.

As shown in FIG. 7, the rod 580 constitutes a transmission member for transmitting a spring force of the helical compression spring 560 to the ball 540. The rod 580 is disposed between the helical compression spring 560 and the ball 540.

More specifically, the rod 580 includes a ball abutting surface 581 that abuts with the ball 540, a spring receiving surface 582 that abuts with the seat surface 562 on a side of the ball 540, and a cylindrical spring guiding portion 583 which protrudes from the spring receiving surface 582 so as to be inserted into the helical compression spring 560.

The ball abutting surface 581 is a flat surface which inclines with respect to a surface which is perpendicular to the pressure action direction X. Further, the rod 580 is assembled to the sleeve 520 in a state in which the ball abutting surface 581 inclines in the same direction as the spring receiving surface 527 of the sleeve 520.

Accordingly, since the ball abutting surface 581 of the rod 580 is a flat surface, a direction of action of the spring force that is transmitted to the ball 540 can be kept constant. Therefore, it is possible to more reliably ensure a vibration inhibition effect of the ball 540.

(Modifications)

In the embodiments described above, examples were given in which the check valve according to the present invention is applied to a pump for a brake actuator. However, the check valve according to the present invention as may be applied to a pump other than that used in a brake actuator.

Moreover, use of the check valve according to the present invention is not limited to a discharge system of a pump. The check valve may be used in any piping system in which fluid flows. Particularly, it is preferably used as a check valve in a piping system in which fluid pressure pulsation is large.

While the above description is of the preferred embodiments of the present invention, it should be appreciated that the invention may be modified, altered, or varied without deviating from the scope and fair meaning of the following claims.

What is claimed is:

1. A check valve comprising:

a case member in which a fluid path is formed, and an opening, which is located in the fluid path, is formed in the case member;

a valve seat surface, which is formed in the case member and disposed in the middle of the fluid path;

a valve body which is disposed downstream of the valve seat surface in the fluid path and opens and closes the fluid path by seating on and separating from the valve seat surface; and a helical compression spring which is disposed in the case member and urges the valve body in a valve closing direction, wherein:

a side wall surface and a spring receiving surface are formed in the case member;

the side wall surface restricts a movement area of the valve body in a direction perpendicular to a pressure action direction, wherein the pressure action direction is defined as a direction in which a pressure of a fluid upstream of the valve seat surface acts;

the spring receiving surface buts with one end of the helical compression spring; and the spring receiving surface is inclined with respect to a plane that is perpendicular to the pressure action direction so that a perpendicular component of a force applied to the valve body by the helical compression spring is applied generally toward the opening, wherein the perpendicular component is perpendicular to the pressure action direction.

2. The check valve according to claim 1, wherein the valve body is constituted by a ball.

3. The check valve according to claim 1, further comprising a transmission member that is disposed between the valve body and the helical compression spring for transmitting an urging force of the helical compression spring to the valve body, wherein a surface of the transmission member that abuts with the valve body is a flat surface.

4. A brake actuator which is structured in which a brake fluid pressure is transmitted from a master cylinder to a wheel cylinder, so as to generate a braking force on a wheel, and which includes a pump that sucks up brake fluid at the wheel cylinder side and discharges the sucked up brake fluid to the master cylinder side, wherein the check valve according to claim 1 is disposed at the discharge side of the pump.

* * * * *